United States Patent [19]
Tamada et al.

[11] 3,949,313
[45] Apr. 6, 1976

[54] DEMODULATION SYSTEM FOR DIGITAL INFORMATION

[75] Inventors: Tomoo Tamada, Tama; Takeshi Kato, Funabashi, both of Japan

[73] Assignee: Tokyo Magnetic Printing Company Ltd., Tokyo, Japan

[22] Filed: May 28, 1974

[21] Appl. No.: 473,450

[30] Foreign Application Priority Data
Nov. 27, 1973 Japan.............................. 48-132137

[52] U.S. Cl. ................ 329/106; 328/111; 329/126; 360/25
[51] Int. Cl.² ......................................... H03K 9/08
[58] Field of Search.................... 329/104, 126, 106; 328/111, 63; 307/269; 360/25, 26, 27, 51

[56] References Cited
UNITED STATES PATENTS

| | | |
|---|---|---|
| 3,243,580 | 3/1966 | Welsh .............................. 329/104 X |
| 3,418,433 | 12/1968 | Hodge............................. 329/106 X |
| 3,532,999 | 10/1970 | Vermeulen ..................... 329/104 X |
| 3,590,280 | 6/1971 | Hudson............................ 328/63 X |
| 3,601,710 | 8/1971 | Morra................................. 329/104 |
| 3,602,828 | 8/1971 | Kurzweil et al..................... 329/104 |
| 3,683,288 | 8/1972 | Curry................................. 329/104 |
| 3,805,175 | 4/1974 | Nassimbene....................... 329/104 |

Primary Examiner—John Kominski
Attorney, Agent, or Firm—Merchant, Gould, Smith & Edell

[57] ABSTRACT

A demodulation system for digital information, recorded by an FM or PM system, which provides a clock output pulse whose pulse width is proportional to the time length of the preceding bit frame and said clock output signal is utilized for demodulating the recorded data. Said pulse width can be controlled either by an analog or a digital circuit and thus, the present invention has the advantage that the information is demodulated stably though the moving speed of the recording medium is changed or deviated.

3 Claims, 16 Drawing Figures

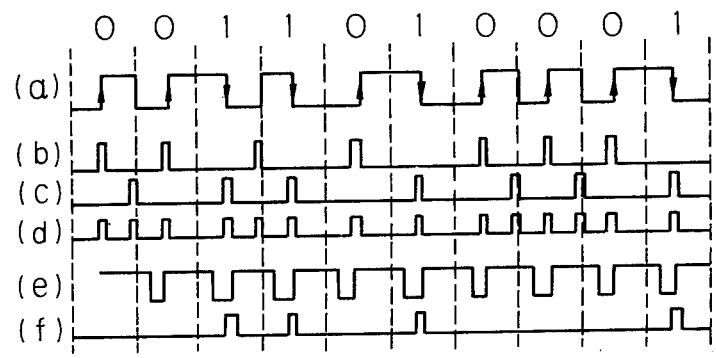
Fig. 1 PRIOR ART
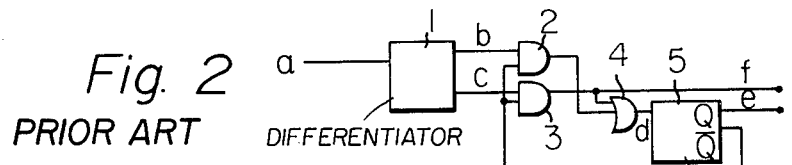
Fig. 2 PRIOR ART
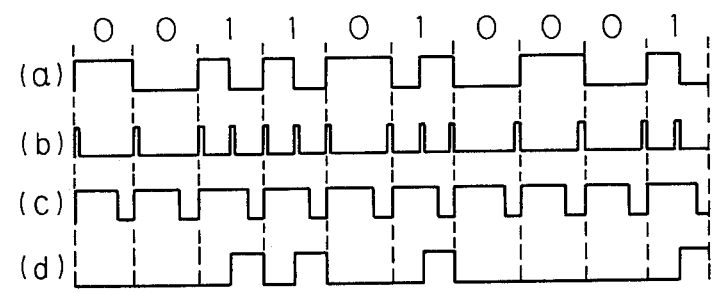
PRIOR ART Fig. 3
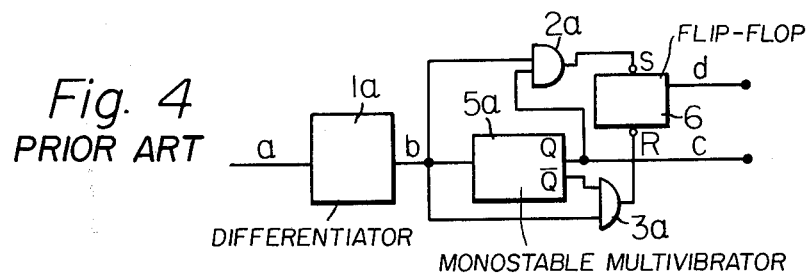
Fig. 4 PRIOR ART

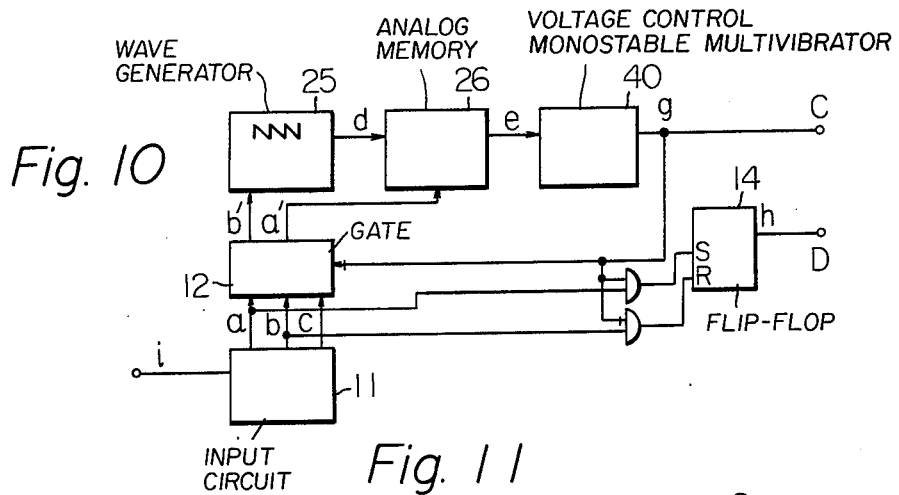
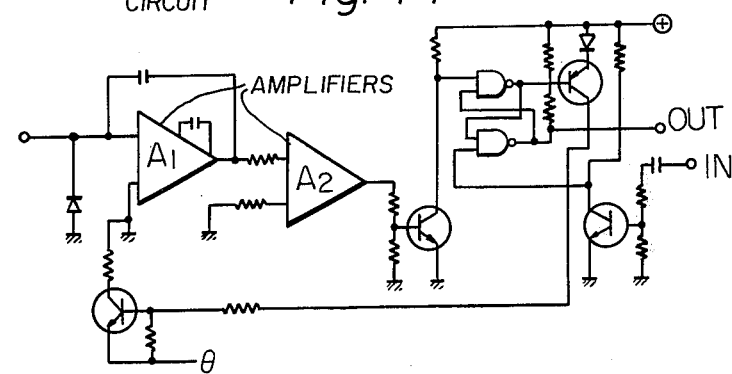
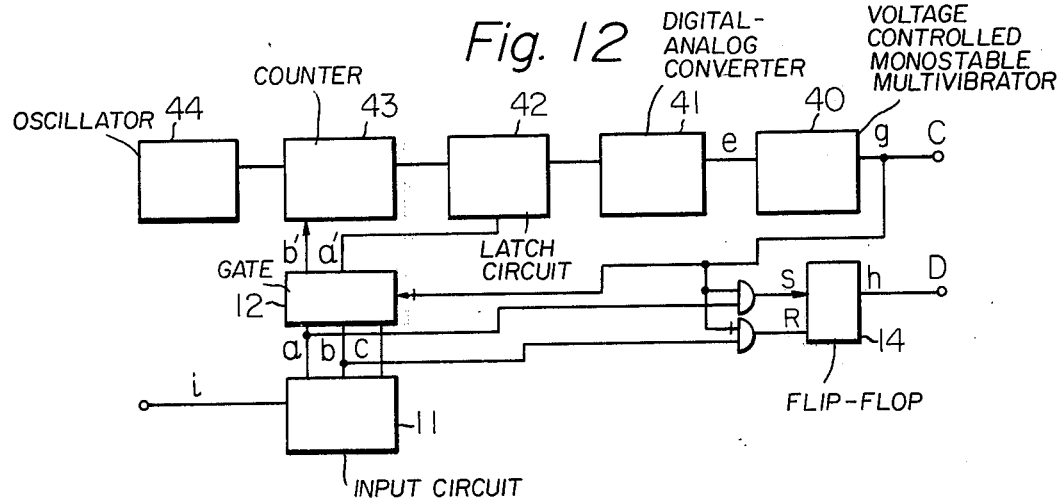

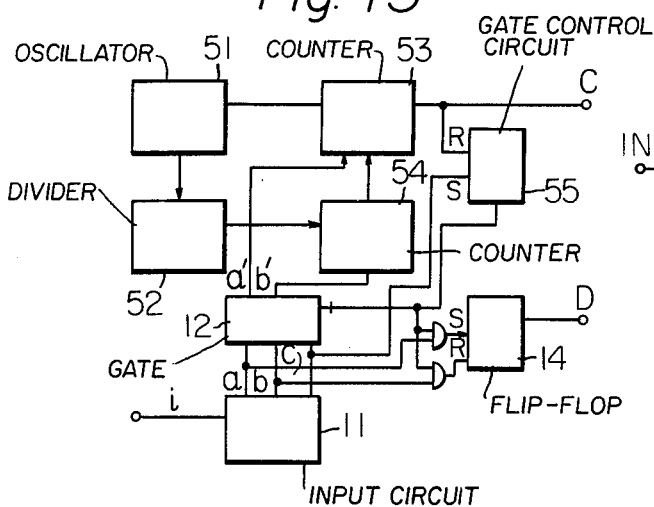
Fig. 13
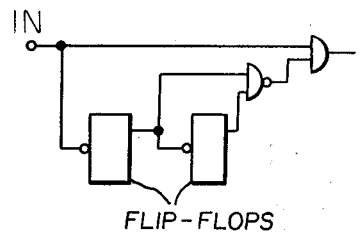
Fig. 14
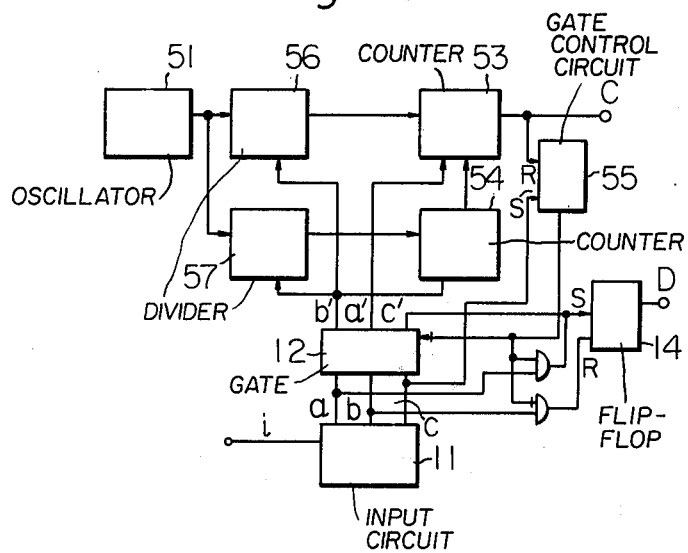
Fig. 15
Fig. 16
```
      P 8 4 2 1
P8421
0 10000
1 00001
2 00010
3 10011
4 00100
5 10101
6 10110
7 00111
8 01000
9 11001
```

DEMODULATION SYSTEM FOR DIGITAL INFORMATION

BACKGROUND OF THE INVENTION

The present invention relates, generally, to a method and an apparatus for demodulation, in particular, relates to a method and an apparatus for demodulation of digital information recorded by a PM and FM system on a magnetic or optical recording medium.

The NRZ (non-return-to-zero) system has been utilized for the recording system for digital information. However, the NRZ system has the disadvantages that: (a) the recording frequency changes are large due to the change of the pattern of the recorded information; (b) a particular gate pulse is necessary for the demodulation of the recorded information; (c) the allowable length of skew due to the lateral vibration of recording medium is extremely severe. In order to overcome the disadvantages of the NRZ system, the two-frequency coherent phase system, that is, PM system or FM system, has lately been proposed and utilized very widely in the art. Particularly, the latter system is widely utilized for the recording of a bank card since the American Bankers Association adopted that system. The FM and PM system has no problem related to said skew, since the self-clocking operation in a recording channel is automatically performed, and has many advantages compared with the prior NRZ system.

However, the prior demodulation system for an FM or PM system has a disadvantage that the longitudinal moving speed of a recording medium should be kept strictly constant, and that a complicated mechanism with an electric motor is needed for the movement of a magnetic card.

SUMMARY OF THE INVENTION

The general purpose of the present invention is to provide a method and an apparatus for demodulation of digital information which operates stably even the moving or sending speed of the recording medium is changed, and to provide an apparatus for demodulation of digital information having a simple structure and low cost.

It is an object, therefore, of the present invention to overcome the disadvantages and limitations of the prior demodulation systems by providing a new and improved method for demodulation.

It is also an object of the present invention to provide a new and improved demodulator.

The above and other objects are attained by the present demodulating system for digital information recorded by one system selected from an FM system and PM system, comprising the steps of generating an analog signal whose amplitude relates to the time length of the preceding bit frame, generating a clock output pulse having the initial point at the start of the present bit frame, the duration of the clock output pulse from said initial point to the end point relating to said amplitude of said analog signal, and demodulating a data output signal by masking the signal to be demodulated by said clock output signal.

Another feature of the present invention is a demodulation system for digital information recorded by one system selected from an FM system or PM system, comprising the steps of storing a number of timing pulses in a first counter during the preceding bit frame, transferring the content of said first counter to a second counter at the initial time of the present bit frame, counting the number of said timing pulses by said second counter in order to provide a clock output signal having a significant information when said second counter overflows, and demodulating a data output signal by masking the signal to be demodulated by said clock output signal.

BRIEF DESCRIPTION OF THE DRAWINGS

The foregoing and other objects, feature and attendant advantages of the invention will be appreciated as the same become better understood from the hereinafter provided description with reference to the accompanying drawings wherein:

FIG. 1 shows waveforms of a prior PM system;

FIG. 2 shows a block diagram of a prior PM demodulator of the waveforms of FIG. 1;

FIG. 3 shows waveforms of a prior FM system;

FIG. 4 shows a block diagram of a prior FM demodulator, of the waveforms of FIG. 3;

FIG. 10 shows a block diagram of a demodulator according to the third embodiment of the present invention;

FIG. 11 shows a block diagram of the voltage-controlled multi-vibrator 40 in FIG. 10;

FIG. 12 shows a block diagram of a demodulator according to the fourth embodiment of the present invention;

FIG. 13 shows a block diagram of a demodulator according to the fifth embodiment of the present invention;

FIG. 14 shows a block diagram of the frequency divider 52 in FIG. 13;

FIG. 15 shows a block diagram of a demodulator according to the sixth embodiment of the present invention, and;

FIG. 16 shows some examples of optical bar codes.

DETAILED DESCRIPTION OF THE PREFERRED EMBODIMENTS

Figure 5:
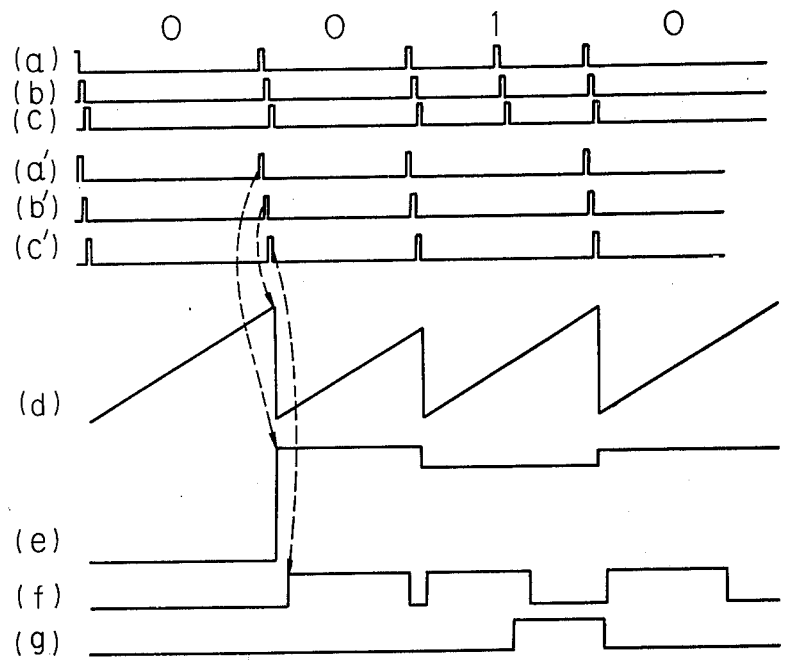
FIG. 5 shows waveforms according to the first embodiment of the present invention.

First, the operational principles of PM and FM systems, their prior demodulators and their disadvantages will be briefly explained.

FIG. 1 shows explanatory waveforms of the PM system, and FIG. 2 shows a block diagram of a prior PM demodulator. Provided that the digital information "0011010001," as shown in FIG. 1, is recorded on a magnetic recording medium with a PM system, the waveform of that information read by a magnetic head is shown in FIG. 1(a). As apparent from FIG. 1(a), the voltage level of the signal in a PM system always changes at the middle point of each bit frame, and the direction of that voltage level change depends upon the recorded information 0 or 1. In the present embodiment, the voltage level changes from low level to high level when the recorded data is zero, and from high level to low level when the recorded data is one. The signal shown in FIG. 1(a) is applied to the differential circuit 1 (FIG. 2), which provides two output signals (b) and (c) shown in FIG. 1(b) and FIG. 1(c). The signal (b) appears just when the voltage level in FIG. 1(a) goes from low level to high level, and the signal (c) appears just when said level goes from high to low. The signals (b) and (c) are applied to the first inputs of AND circuits 2 and 3, respectively. The second inputs of the AND circuits 2 and 3 are provided with the negative output signal $\overline{Q}$ of the monostable multivibrator 5. The AND circuit 3 provides the output signal shown in FIG. 1(f), which is the final output signal corresponding to the recorded data from the demodulator. The output signals from the AND circuits 2 and 3 provide the signal shown in FIG. 1(d) through the OR circuit 4. The signal shown in FIG. 1(d) triggers the monostable multivibrator 5, which provides the positive output signal Q shown in FIG. 1(e) and its reverse polarity signal $\overline{Q}$. The pulse width of the signal shown in FIG. 1(e) is three-fourth of that of the period of the recorded data, and said pulse signal works as a clock pulse for processing the output data shown in FIG. 1(f) in the succeeding stages.

FIG. 3 shows waveforms of a prior FM system, and FIG. 4 is a block diagram of a prior FM demodulator. Assuming that the digital information "0011010001" is recorded on a recording medium with an FM system, the output signal from a magnetic head relating to that information is shown in FIG. 3(a). It is a feature of FM systems that the voltage level of the recorded data changes always at the boundary point of bit frames, and changes at the middle point of the bit frame if the recorded data is one, as shown in FIG. 3(a). Therefore, the frequency of the recorded data when said data is one is twice as large as the frequency when the recorded data is zero. The signal of FIG. 3(a) is applied to a differential circuit 1a (FIG. 4), which provides the output signal shown in FIG. 3(b) and triggers a monostable multivibrator 5a. The monostable multivibrator 5a provides the normal output Q shown in FIG. 3(c) as a clock pulse, and its reverse polarity signal $\overline{Q}$. The signal (b) shown in FIG. 3(b) and the signal (c) shown in FIG. 3(c) are applied to the AND circuit 2a, whose output sets the flip-flop 6 to the set condition. The flip-flop 6 is re-reset by the output of the AND circuit 3a, which is supplied input signals from the reverse output $\overline{Q}$ and the differential circuit 1a. The pulse width of the monostable multivibrator 5a is adjusted beforehand to be three-fourth of the period of the recorded data or a bit frame, as shown in FIG. 3(c). The waveform of the final output of the demodulator is provided by the flip-flop 6 as a data output signal, as shown in FIG. 3(d).

The main disadvantage of prior demodulators of FIG. 2 and FIG. 4 is that the pulse width of the output signal of monostable multivibrators 5 and 5a is fixed so as to be three-fourth of the period of the recorded data or a bit frame and, thus, the recorded data and a clock pulse can not be demodulated when the change of the moving or sending speed of the medium causes a large change of the period of the recorded data.

The following embodiments of the present invention which overcome the disadvantages of the prior arts are explained with regard to the FM system. However, the same concept as in the following embodiments can, of course be applied to the demodulation of the PM system.

Figure 6:
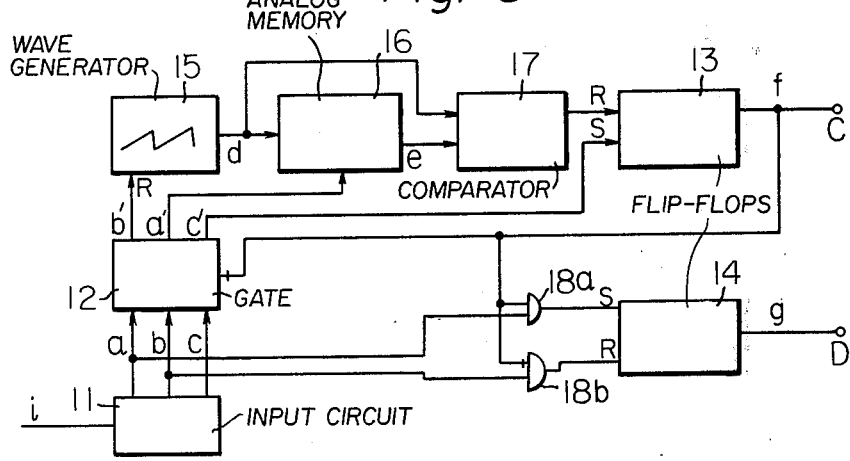
FIG. 6 shows a block diagram of a demodulator according to the first embodiment of the present invention, of the waveforms of FIG. 5.

FIG. 5 shows waveforms according to the first embodiment, whose block diagram is shown in FIG. 6. In FIG. 6, the reference number 11 is an input circuit, 12 is a gate circuit, 13 is a clock output circuit, 14 is a data output circuit, 15 is a saw-tooth wave generator, 16 is an analog memory, 17 is a comparator, and 18a and 18b are AND circuits. The input circuit 11 receives the signal i, whose waveform is the same as that of recorded data in a medium, the waveform of FIG. 3(a) is one example of the signal i, and FIG. 5 shows the waveforms of each point of FIG. 6 when the recorded data is "0010." The input circuit 11 provides pulse trains shown in FIGS. 5(a), 5(b) and 5(c), every time the voltage level of the input signal i changes. The pulses in the pulse trains of FIGS. 5(a), 5(b) and 5(c) appear at slightly different times from one another. The waveforms of FIGS. 5(a'), 5(b') and 5(c') are obtained from said pulse trains of FIGS. 5(a), 5(b) and 5(c) through a gate circuit 12, which receives as a gate signal a reversal polarity signal of an output shown in FIG. 5(f) from the output of a clock output circuit 13. The saw-tooth wave generator 15 provides the output signal shown in FIG. 5(d), whose voltage level increases at a predetermined rate relating to the time constant of the generator, and is re-set to zero by the pulse train of FIG. 5(b'). The analog memory 16 is a conventional sampling hold circuit which receives the output of the generator 15 and provides an output voltage with a level relative to the input level when a pulse of FIG. 5(a') occurs; the output waveform of the analog memory 16 is shown in FIG. 5(e). In other words, the output voltage of the analog memory 16 is proportional to the time duration of a preceding bit frame. The comparator 17 provides an output signal as a time reference signal when the ratio of the output of the analog memory 16 to the output of the saw-tooth wave generator 15 reaches a predetermined value, i.e., 4 : 3. The clock output circuit 13 is a conventional flip-flop, which is set by the pulse train of FIG. 5(c') and is re-set to zero by the output of the comparator 17; the output waveform of the circuit 13 is shown in FIG. 6(f). The pulse width of the clock pulse shown in FIG. 5(f) is three-fourth of the time duration of the preceding bit frame in the present embodiment. The data output circuit 14 is, also, a conventional flip-flop, which is set by the output of AND circuit 18a, and is re-set by the output of AND circuit 18b. The AND circuit 18a receives the output of the clock output circuit 13 shown in FIG. 5(f) and the pulse train in FIG. 5(a). The AND circuit 18b receives the reversal polarity signal of the output of the clock output circuit 13 and the pulse train in FIG. 5(b); the output waveform of the data output circuit 14 is shown in FIG. 5(g). Said two AND circuits 18a and 18b work as masks for a data output signal. Therefore, the final outputs of the demodulator of FIG. 6 are the clock pulse of FIG. 5(f) and the demodulated data of FIG. 5(g). Although we explained above that the comparator 17 provided an output signal when the ratio of two input signals to said comparator was 4 : 3, said ratio could be designed between 0.5 − 1 ( = 2 : 1 − 1 : 1). It is one of the advantages of the present invention that the pulse width of the clock pulse in FIG. 5(f) is not fixed but is about three-fourth of the time duration of the preceding bit frame. Accordingly said pulse width changes according to the change of the moving or sending speed of a recording medium. Therefore, a recorded data can be demodulated and processed correctly using said clock pulse even when the moving or sending speed of a recording medium is change. All embodiments of the present invention explained hereinafter also have that advantage.

Figure 7:
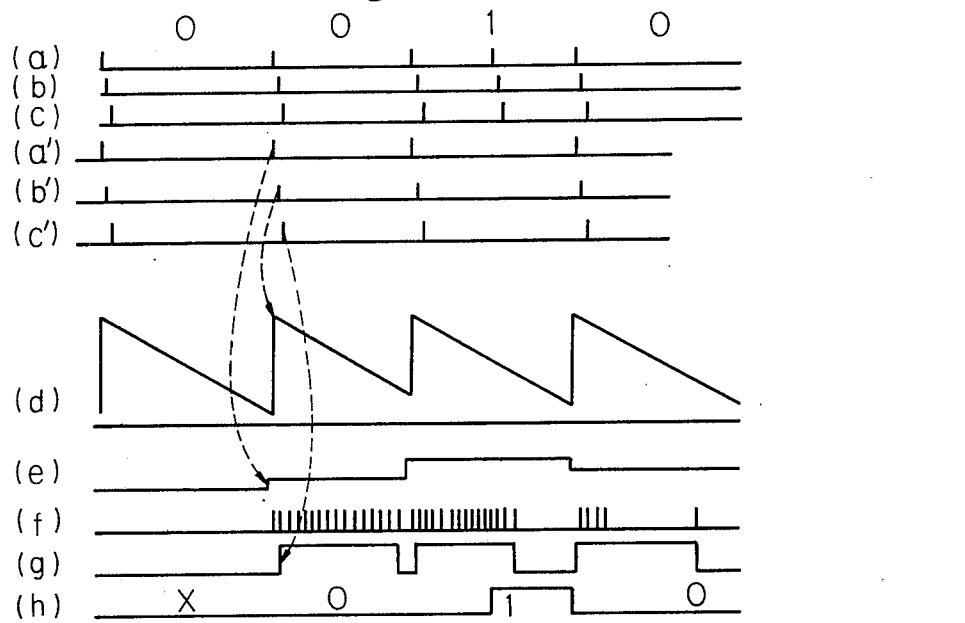
FIG. 7 shows waveforms according to the second embodiment of the present invention.
Figure 8:
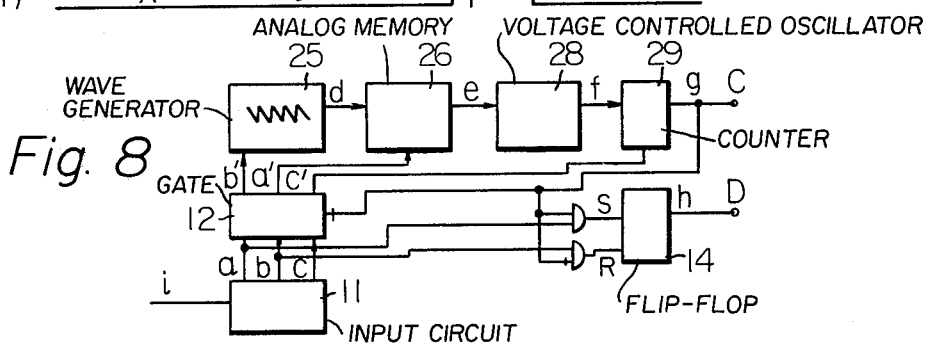
FIG. 8 shows a block diagram of a demodulator according to the second embodiment of the present invention, of the waveforms of FIG. 7.
Figure 9:
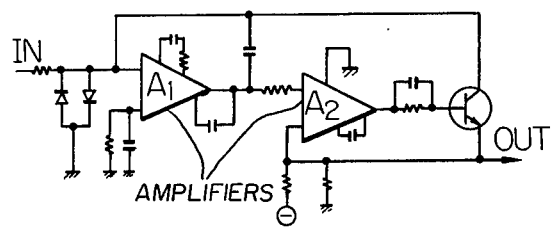
FIG. 9 shows a block diagram of the voltage-controlled oscillator 28 in FIG. 8.

FIG. 7 shows waveforms according to the second embodiment of the present invention, and FIG. 8 shows a block diagram of a demodulator for the waveforms of FIG. 7. In FIG. 8, 11 is an input circuit, 12 is a gate circuit and 14 is a data output circuit, and these circuits function the same as those in FIG. 6. Further 25 is a saw-tooth wave generator, 26 is an analog memory, 28 is a voltage controlled oscillator whose output frequency is controlled by its input voltage and 29 is a counter. To the input circuit 11 is applied a signal $i$, whose waveform is the same as that in the recording medium, and the input circuit 11 provides three pulse trains $(a)$, $(b)$ and $(c)$ of FIG. 7 whose pulses occur whenever the voltage level of the input signal $i$ changes. The instants that pulses occur in the pulses trains $(a)$, $(b)$ or $(c)$ are a little different from one another as shown in FIGS. 7$(a)$, $(b)$ and $(c)$. A gate circuit 12 provides pulse trains $(a')$, $(b')$ and $(c')$ in FIG. 7 from the pulse trains $(a)$, $(b)$ and $(c)$ on the condition that the clock output $(g)$ in FIG. 7 is zero. A saw-tooth wave generator 25 provides the output waveform shown in FIG. 7$(d)$, which is triggered by a pulse $(b')$ and whose voltage decreases linearly according to the time constant of said generator 25. An analog memory 26 stores the value of the amplitude of output waveform $(d)$ at a time when a pulse in the pulse train $(a')$ occurs, accordingly the output waveform of the analog memory 26 is shown in FIG. 7$(e)$. The output of said analog memory 26 is applied to the input of a voltage controlled oscillator 28, which, in turn, provides output pulses $(f)$ of the frequency proportional to the amplitude of the input voltage $(e)$. For instance, assuming that the voltage controlled oscillator 28 is designed to provide sixteen pulses during each bit frame, then, said oscillator 28 always provides 16 pulses for each bit frame in spite of a change of the duration of a bit frame. The reason for this is that the amplitude of the waveform $(e)$ in FIG. 7 is inversely proportional to the duration of the preceding bit frame, and in turn the oscillating frequency is also inversely proportional to the duration of the preceding bit frame. Therefore, a counter 29 should be designed to provide an output signal when 12 input pulses are obtained from said oscillator 28 after each pulse in the pulse train $(c')$ in FIG. 7; the output waveform of the counter 29 is shown in FIG. 7$(g)$. As will be apparent from the above explanation the pulse width of the waveform of the demodulation clock pulse in FIG. 7$(g)$ is 12/16 ( = ¾) of the duration of the preceding bit frame. The data output circuit 14 is composed of a flip-flop circuit like that in FIG. 6, which provides the data output signal shown in FIG. 7$(h)$. The voltage controlled oscillator 28 can be composed of an integrated circuit, MC 12024 LP manufactured by Motorola Inc. in the U.S.A., or it can be composed of the circuit in FIG. 9 both of which have been well known in the art.

FIG. 10 shows a block diagram of a demodulator according to the third embodiment of the present invention. The difference between the embodiments in FIG. 8 and FIG. 10 is that the embodiment of FIG 10 has a saw-tooth wave generator 25 of the type of FIG. 8 and a voltage controlled monostable multivibrator 40 instead of the voltage controlled oscillator 28 and the counter 29 in FIG. 8. Said multivibrator 40 provides an output pulse, whose duration is controlled by its input voltage, and provides the output pulse shown in FIG. 7$(g)$ directly from the input waveform in FIG. 7$(e)$. In FIG. 10, the amplitude of the waveform in FIG. 7$(e)$, which is applied to the input of the multivibrator 40, is proportional to the duration of the preceding bit frame and, thus, the pulse width of the output of said multivibrator 40 is also proportional to the length of the preceding bit frame. Said pulse width is, for instance, three-fourth of the length of the preceding bit frame and said output of said multivibrator 40 is used as a clock output signal. The configuration of the voltage controlled monostable multivibrator 40 is well known in the art, and one example of it is shown in FIG. 11.

FIG. 12 is a block diagram of a demodulator according to the fourth embodiment of the present invention. The difference between the embodiments of FIG. 10 and FIG. 12 is in the structure for obtaining the corresponding voltage whose amplitude is related to the duration of the preceding bit frame. In FIG. 12, the output pulses of a self-oscillator 44 between each bit frame (between each pulse in the pulse train $(b')$) are counted by a counter 43 and the content of said counter 43 at the timing of the pulse train $(a')$ is kept in a latch circuit 42. The output of said latch circuit 42 provides an analog voltage whose amplitude relates to the duration of a preceding bit frame through a digital-analog convertor 41. Said voltage provides the clock output signal shown in FIG. 7$(g)$ by a similar structure to the related portions of FIG. 8 or FIG. 10.

FIG. 13 shows a block diagram of a demodulator according to the fifth embodiment of the present invention. In this embodiment, the pulse width of the clock output is controlled by a pure digital circuit. In FIG. 13, reference numbers 11, 12 and 14 are an input circuit, a gate circuit, and a data output circuit, respectively; 51 is a self-oscillator, 52 is a divider, 53 is an up-down counter, 54 is a counter and 55 is a gate control circuit. The divider 52 functions, for example, to provide three pulses for every four input pulses, and such a counter can, for example, be constructed by the flip-flops and AND gates shown in FIG. 14. The counter 53 is an up-down counter which is capable of handling the data load on it, and can, for instance, be an integrated circuit 74191 manufactured by Fairchild Co., in the U.S.A.

The counter 54 is cleared to zero by the pulse train $(b')$ in FIG. 7 and, after that, counts a number of pulses from the divider 52. Therefore, supposing that the oscillator 51 generates, for instance, 16 pulses during the preceding bit frame, the content of the counter 54 becomes 12 ( = 16 × ¾) at the end of the preceding bit frame. The up-down counter 53 is loaded with the content of the counter 54 ( = 12) at each timing of the pulse train $(a')$ in FIG. 7. Next each pulse from the oscillator 51 reduces the content of said counter 53 by one during the present bit frame. The content of said counter 53 reaches zero when it receives 12 pulses from the oscillator 51, and said counter 53 provides a borrow pulse just when it receives a 13th pulse from the oscillator 51. Said borrow pulse occurs at the timing of three-fourth of the length of the bit frame from the initial point of said bit frame, and said borrow pulse can be used directly, as a clock output signal.

In FIG. 13, if a number of output pulses of the oscillator 51 during each bit frame is not a multiple of 4, the timing when the borrow occurs changes a little for each bit frame. In order to overcome this problem, the number of pulses in each bit frame may be increased according to a law of a large number in a statistical theory.

FIG. 15 shows a block diagram of a demodulator of the sixth embodiment of the present invention. In FIG. 15, the elements which function the same as those of FIG. 13 have the same reference numbers as the corresponding elements in FIG. 13, and reference numbers 56 and 57 are dividers. The divider 56 provides pulses the number of which is for instance equal to one third of the number of input pulses, and the output pulse of said divider 56 has 50 percent of the duty cycle. That is to say, the pulse width is 50 percent of the period of the pulse. The divider 54 provides pulses, the number of which is equal to one fourth of the number of input pulses. In the preceding bit frame, the pulse in the pulse train ($b'$) of FIG. 7 clears the counter 54 and the dividers 56 and 57 to zero. Assuming that the oscillator 51 provides 120 pulses during said bit frame, then, the content of the counter 54 is 30 ( = 120 × ¼) at the end of said bit frame. Said content ( = 30) is transferred to the up-down counter 53 by the next pulse of the pulse train ($a'$) in FIG. 7. Next, each output pulse from the divider 56 reduces the content of the up-down counter 53 during the present bit frame. However, since the divider 56 is a one-third divider, it provides 40 pulses during the bit frame. Accordingly, the counter 53 provides a borrow pulse just when the divider 56 provides 31st pulse. Said borrow pulse is used as a clock output signal. The borrow pulse occurs approximately ¾ ( ≈ 31/40) of a bit frame from the initial point of the bit frame.

In FIG. 13 and FIG. 15, the gate control circuit 55 functions to provide the waveform shown in FIG. 5($f$) from the output of the counter 53, and the operations and the structure of the data output circuit 14 and its related circuits are the same as those in FIGS. 6, 8, 10 and 12. Further, in FIG. 13 and FIG. 15, the counter 53 could be replaced by and up-down counter, in which case the complement of the output of the counter 54 should be transferred to the counter 53 (up-down counter), whose carry output instead of a borrow output is used as a clock output signal.

The embodiments of FIG. 13 and FIG. 15 can function for detecting an operational error. When a speed of a medium is too slow, a content of the counter 53 at the timing of $a'$ is smaller than a predetermined value, while when a speed of a medium is too fast, the counter 54 overflows. Of course, if the speed of medium is not proper, an operational error occurs. Therefore, by checking the contents of the counters 53 and 54, an operational alarm which indicates the operational error can be provided.

The above mentioned embodiments have been explained for a demodulator in an FM system. It should be noted, however, that a demodulator in a PM system can be almost the same structure as the above-mentioned embodiments.

A demodulator system according to the present invention is applicable for the demodulation of FM or PM signals recorded on various kinds of medium, such as magnetic recording medium or optical recording medium. In an optical recording system, digital information is recorded on the medium by optical bar codes in an FM system as shown in FIG. 16. Said optical bar codes are transduced to an electrical signal by a photoelectric element and said electrical signal provides a data output signal and a clock output signal through one of the demodulators described hereinbefore. FIG. 16 is an example of bar codes in an FM system corresponding to numerical information of 0 through 9, and each said numerical information has four bits (1, 2, 3 and 4) of binary-decimal number and an odd parity bit (P).

As mentioned above, a demodulator according to the present invention can provide a stable demodulated output signal even through the input frequency of an FM and PM signal changes or deviates. Therefore, when the present demodulator is used in a magnetic card reader, a single demodulator can demodulate the signals of both speeds, 210 BPI (bit-per-inch) and 75 BPI. The present demodulator has the advantages that the adjustment of the mechanical parts is simple, the operational reliability is improved, from the prior arts and the manufacturing cost is small. Further, since the present demodulator can be used in a variable speed system of a medium, it is even applicable to the demodulation system in which the recording medium is moved or sent manually.

From the foregoing it will now be apparent that a new and improved demodulator has been found. It should be understood, of course, that the embodiments disclosed are merely illustrative and are not intended to limit the scope of the invention. Reference should be made to the appended claims, rather than the specification as indicating the scope of the invention.

Finally, reference numbers used in the drawings are listed below.

1. differential circuit
2, 3. AND circuit
4. OR circuit
5. monostable multivibrator
11. input circuit
12. gate circuit
13. clock output circuit
14. data output circuit
15. saw-tooth wave generator
16. analog memory
17. comparator
18a, 18b. AND circuit
25. saw-tooth wave generator
26. analog memory
28. voltage controlled oscillator
29. counter
40. voltage controlled monostable multivibrator
41. digital-analog converter
42. latch circuit
43. counter
44. self oscillator
51. self oscillator
52. divider
53. up-down counter
54. counter
55. gate control circuit
56, 57. divider

What is claimed is:

1. A method for demodulating digital information recorded by one system selected from an FM system or PM system, comprising the steps of storing a member of timing pulses in a first counter during the preceding bit frame, transferring the content of said first counter to a second counter at the initial time of the present bit frame, counting the number of said timing pulses by said second counter in order to provide a clock output signal having a significant information when said second counter overflows, and demodulating a data output signal by masking the signal to be demodulated by said clock output pulse.

2. A demodulation system for digital information recorded by one system selected from an FM system and PM system, comprising an oscillator for providing a timing pulse, a first divider connected to the output of said oscillator for providing one $m$'th of the timing pulses, a first counter connected to the output of said first divider for counting the number of the divided pulses during the preceding bit frame, a second divider connected to the output of said oscillator for providing one $n$'th of the timing pulses, a second counter connected to the outputs of both said second divider and first counter for receiving the content of said first counter at the initial time of the present bit frame and counting the number of output pulses of said second counter in order to provide a clock output signal having a significant information when the second counter overflows, and means for providing a data output signal by masking the signal to be demodulated by said clock output pulse, wherein the ratio $n/m$ satisfies $0.5 \leq n/m < 1$.

3. A demodulation system according to claim 2, wherein a value of $m$ is 4 and a value of $n$ is 3.

* * * * *